United States Patent
Fernsler et al.

(10) Patent No.: US 10,037,211 B2
(45) Date of Patent: Jul. 31, 2018

(54) OPERATION OF A MULTI-SLICE PROCESSOR WITH AN EXPANDED MERGE FETCHING QUEUE

(71) Applicant: International Business Machines Corporation, Armonk, NY (US)

(72) Inventors: Kimberly M. Fernsler, Cedar Park, TX (US); David A. Hrusecky, Cedar Park, TX (US); Hung Q. Le, Austin, TX (US); Elizabeth A. McGlone, Rochester, MN (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 15/077,015

(22) Filed: Mar. 22, 2016

(65) Prior Publication Data
US 2017/0277542 A1 Sep. 28, 2017

(51) Int. Cl.
*G06F 9/312* (2018.01)
*G06F 9/38* (2018.01)
(Continued)

(52) U.S. Cl.
CPC ........ *G06F 9/3851* (2013.01); *G06F 9/30043* (2013.01); *G06F 12/0875* (2013.01);
(Continued)

(58) Field of Classification Search
CPC .... G06F 9/3824; G06F 9/3836; G06F 9/3851; G06F 9/3855; G06F 9/30043; G06F 12/0875; G06F 13/4068; G06F 2212/452
(Continued)

(56) References Cited

U.S. PATENT DOCUMENTS

| 4,858,113 | A | 8/1989 | Saccardi |
| 5,055,999 | A | 10/1991 | Frank et al. |

(Continued)

FOREIGN PATENT DOCUMENTS

| CN | 101021778 A | 8/2007 |
| CN | 101676865 A | 3/2010 |

(Continued)

OTHER PUBLICATIONS

U.S. Appl. No. 15/152,257, to Sundeep Chadha et al., entitled, *Operation of a Multi-Slice Processor Implementing a Load/Store Unit Maintaining Rejected Instructions*, assigned to International Business Machines Corporation, 37 pages, filed May 11, 2016.

(Continued)

*Primary Examiner* — Daniel H Pan
(74) *Attorney, Agent, or Firm* — Joseph D. Downing; Robert R. Williams; Kennedy Lenart Spraggins LLP

(57) ABSTRACT

Operation of a multi-slice processor that includes a plurality of execution slices and a plurality of load/store slices, where each load/store slice includes a load miss queue and a load reorder queue, includes: receiving, at a load reorder queue, a load instruction requesting data; responsive to the data not being stored in a data cache, determining whether a previous load instruction is pending a fetch of a cache line comprising the data; if the cache line does not comprise the data, allocating an entry for the load instruction in the load miss queue; and if the cache line does comprise the data: merging, in the load reorder queue, the load instruction with an entry for the previous load instruction.

17 Claims, 6 Drawing Sheets

(51) Int. Cl.
*G06F 12/00* (2006.01)
*G06F 13/38* (2006.01)
*G06F 12/0875* (2016.01)
*G06F 9/30* (2018.01)
*G06F 13/40* (2006.01)

(52) U.S. Cl.
CPC ........ *G06F 13/4068* (2013.01); *G06F 9/3824* (2013.01); *G06F 9/3836* (2013.01); *G06F 9/3855* (2013.01); *G06F 2212/452* (2013.01)

(58) Field of Classification Search
USPC ...... 712/214–219, 225; 711/125; 710/15, 16
See application file for complete search history.

(56) References Cited

U.S. PATENT DOCUMENTS

| | | |
|---|---|---|
| 5,095,424 A | 3/1992 | Woffinden et al. |
| 5,353,426 A | 10/1994 | Patel et al. |
| 5,471,593 A | 11/1995 | Branigin |
| 5,475,856 A | 12/1995 | Kogge |
| 5,553,305 A | 9/1996 | Gregor et al. |
| 5,630,149 A | 5/1997 | Bluhm |
| 5,680,597 A | 10/1997 | Kumar et al. |
| 5,809,522 A | 9/1998 | Novak et al. |
| 5,809,530 A * | 9/1998 | Samra ................ G06F 12/0897 711/119 |
| 5,822,602 A | 10/1998 | Thusoo |
| 5,913,048 A | 6/1999 | Cheong et al. |
| 5,996,068 A | 11/1999 | Dwyer, III et al. |
| 6,021,485 A | 2/2000 | Feiste et al. |
| 6,026,478 A | 2/2000 | Dowling |
| 6,044,448 A | 3/2000 | Agrawal et al. |
| 6,073,215 A | 6/2000 | Snyder |
| 6,073,231 A | 6/2000 | Bluhm et al. |
| 6,092,175 A | 7/2000 | Levy et al. |
| 6,098,166 A | 8/2000 | Leibholz et al. |
| 6,112,019 A | 8/2000 | Chamdani et al. |
| 6,119,203 A | 9/2000 | Snyder et al. |
| 6,138,230 A | 10/2000 | Hervin et al. |
| 6,145,054 A | 11/2000 | Mehrotra et al. |
| 6,170,051 B1 | 1/2001 | Dowling |
| 6,269,427 B1 | 1/2001 | Kuttanna et al. |
| 6,212,544 B1 | 4/2001 | Borkenhagen et al. |
| 6,237,081 B1 | 5/2001 | Le et al. |
| 6,286,027 B1 | 9/2001 | Dwyer, III et al. |
| 6,311,261 B1 | 10/2001 | Chamdani et al. |
| 6,336,168 B1 * | 1/2002 | Frederick, Jr. ...... G06F 9/30043 710/39 |
| 6,336,183 B1 | 1/2002 | Le et al. |
| 6,356,918 B1 | 3/2002 | Chuang et al. |
| 6,381,676 B2 | 4/2002 | Aglietti et al. |
| 6,418,513 B1 | 7/2002 | Arimilli et al. |
| 6,425,073 B2 | 7/2002 | Roussel et al. |
| 6,463,524 B1 | 10/2002 | Delaney et al. |
| 6,487,578 B2 | 11/2002 | Ranganathan |
| 6,549,930 B1 | 4/2003 | Chrysos et al. |
| 6,564,315 B1 | 5/2003 | Keller et al. |
| 6,654,876 B1 | 11/2003 | Le et al. |
| 6,728,866 B1 | 4/2004 | Kahle et al. |
| 6,732,236 B2 | 5/2004 | Favor |
| 6,839,828 B2 | 1/2005 | Gschwind et al. |
| 6,847,578 B2 | 1/2005 | Ayukawa et al. |
| 6,868,491 B1 | 3/2005 | Moore |
| 6,883,107 B2 | 4/2005 | Rodgers et al. |
| 6,944,744 B2 | 9/2005 | Ahmed et al. |
| 6,948,051 B2 | 9/2005 | Rivers et al. |
| 6,954,846 B2 | 10/2005 | Leibholz et al. |
| 6,978,459 B1 | 12/2005 | Dennis et al. |
| 7,020,763 B2 | 3/2006 | Saulsbury et al. |
| 7,024,543 B2 | 4/2006 | Grisenthwaite et al. |
| 7,086,053 B2 | 8/2006 | Long et al. |
| 7,093,105 B2 | 8/2006 | Webb, Jr. et al. |
| 7,100,028 B2 | 8/2006 | McGrath et al. |
| 7,114,163 B2 | 9/2006 | Hardin et al. |
| 7,124,160 B2 | 10/2006 | Saulsbury et al. |
| 7,155,600 B2 | 12/2006 | Burky et al. |
| 7,191,320 B2 | 3/2007 | Hooker et al. |
| 7,263,624 B2 | 8/2007 | Marchand et al. |
| 7,290,261 B2 | 10/2007 | Burky et al. |
| 7,302,527 B2 | 11/2007 | Barrick et al. |
| 7,386,704 B2 | 6/2008 | Schulz et al. |
| 7,395,419 B1 | 7/2008 | Gonion |
| 7,398,374 B2 | 7/2008 | Delano |
| 7,401,188 B2 | 7/2008 | Matthews |
| 7,469,318 B2 | 12/2008 | Chung et al. |
| 7,478,198 B2 | 1/2009 | Latorre et al. |
| 7,478,225 B1 | 1/2009 | Brooks et al. |
| 7,490,220 B2 | 2/2009 | Balasubramonian et al. |
| 7,509,484 B1 | 3/2009 | Golla et al. |
| 7,512,724 B1 | 3/2009 | Dennis et al. |
| 7,565,652 B2 | 7/2009 | Janssen et al. |
| 7,600,096 B2 | 10/2009 | Parthasarathy et al. |
| 7,669,035 B2 | 2/2010 | Young et al. |
| 7,669,036 B2 | 2/2010 | Brown et al. |
| 7,685,410 B2 | 3/2010 | Shen et al. |
| 7,694,112 B2 | 4/2010 | Barowski et al. |
| 7,707,390 B2 | 4/2010 | Ozer et al. |
| 7,721,069 B2 | 5/2010 | Ramchandran et al. |
| 7,793,278 B2 | 9/2010 | Du et al. |
| 7,836,317 B2 | 11/2010 | Marchand et al. |
| 7,889,204 B2 | 2/2011 | Hansen et al. |
| 7,890,735 B2 | 2/2011 | Tran |
| 7,926,023 B2 | 4/2011 | Okawa et al. |
| 7,949,859 B2 | 5/2011 | Kalla et al. |
| 7,975,134 B2 | 7/2011 | Gonion |
| 7,987,344 B2 | 7/2011 | Hansen et al. |
| 8,046,566 B2 | 10/2011 | Abernathy et al. |
| 8,074,224 B1 | 12/2011 | Nordquist et al. |
| 8,099,556 B2 | 1/2012 | Ghosh et al. |
| 8,103,852 B2 | 1/2012 | Bishop et al. |
| 8,108,656 B2 | 1/2012 | Katragadda et al. |
| 8,131,942 B2 | 3/2012 | Harris et al. |
| 8,131,980 B2 | 3/2012 | Hall et al. |
| 8,135,942 B2 | 3/2012 | Abernathy et al. |
| 8,140,832 B2 | 3/2012 | Mejdrich et al. |
| 8,141,088 B2 | 3/2012 | Morishita et al. |
| 8,166,282 B2 | 4/2012 | Madriles et al. |
| 8,184,686 B2 | 5/2012 | Wall et al. |
| 8,219,783 B2 | 7/2012 | Hara |
| 8,219,787 B2 | 7/2012 | Lien et al. |
| 8,243,866 B2 | 8/2012 | Huang et al. |
| 8,250,341 B2 | 8/2012 | Schulz et al. |
| 8,271,765 B2 | 9/2012 | Bose et al. |
| 8,325,793 B2 | 12/2012 | Zhong |
| 8,335,892 B1 | 12/2012 | Minkin et al. |
| 8,386,751 B2 | 2/2013 | Ramchandran et al. |
| 8,402,256 B2 | 3/2013 | Arakawa |
| 8,412,914 B2 | 4/2013 | Gonion |
| 8,464,025 B2 | 6/2013 | Yamaguchi et al. |
| 8,489,791 B2 | 7/2013 | Byrne et al. |
| 8,521,992 B2 | 8/2013 | Alexander et al. |
| 8,555,039 B2 | 10/2013 | Rychlik |
| 8,654,884 B2 | 2/2014 | Kerr |
| 8,656,401 B2 | 2/2014 | Venkataramanan et al. |
| 8,683,182 B2 | 3/2014 | Hansen et al. |
| 8,713,263 B2 | 4/2014 | Bryant |
| 8,850,121 B1 | 9/2014 | Ashcraft et al. |
| 8,929,496 B2 | 1/2015 | Lee et al. |
| 8,935,513 B2 | 1/2015 | Guthrie et al. |
| 8,966,232 B2 | 2/2015 | Tran |
| 8,984,264 B2 | 3/2015 | Karlsson et al. |
| 9,069,563 B2 | 6/2015 | Konigsburg et al. |
| 9,207,995 B2 | 12/2015 | Boersma et al. |
| 9,223,709 B1 | 12/2015 | O'Bleness et al. |
| 9,519,484 B1 | 12/2016 | Stark |
| 9,665,372 B2 | 5/2017 | Eisen et al. |
| 9,672,043 B2 | 6/2017 | Eisen et al. |
| 9,690,585 B2 | 6/2017 | Eisen et al. |
| 9,690,586 B2 | 6/2017 | Eisen et al. |
| 9,720,696 B2 | 8/2017 | Chu et al. |
| 9,740,486 B2 | 8/2017 | Boersma et al. |
| 9,760,375 B2 | 9/2017 | Boersma et al. |
| 2002/0078302 A1 | 6/2002 | Favor |

(56) References Cited

U.S. PATENT DOCUMENTS

| | | |
|---|---|---|
| 2002/0194251 A1 | 12/2002 | Richter et al. |
| 2003/0120882 A1 | 6/2003 | Granston et al. |
| 2003/0163669 A1 | 8/2003 | Delano |
| 2003/0182537 A1 | 9/2003 | Le et al. |
| 2004/0111594 A1 | 6/2004 | Feiste et al. |
| 2004/0162966 A1 | 8/2004 | Webb, Jr. et al. |
| 2004/0172521 A1 | 9/2004 | Hooker et al. |
| 2004/0181652 A1 | 9/2004 | Ahmed et al. |
| 2004/0216101 A1 | 10/2004 | Burky et al. |
| 2005/0060518 A1 | 3/2005 | Augsburg et al. |
| 2005/0138290 A1 | 6/2005 | Hammarlund et al. |
| 2006/0095710 A1 | 5/2006 | Pires Dos Reis Moreira et al. |
| 2006/0106923 A1 | 5/2006 | Balasubramonian et al. |
| 2007/0022277 A1 | 1/2007 | Iwamura et al. |
| 2007/0079303 A1 | 4/2007 | Du et al. |
| 2007/0101102 A1 | 5/2007 | Dierks, Jr. et al. |
| 2007/0180221 A1 | 8/2007 | Abernathy et al. |
| 2007/0204137 A1 | 8/2007 | Tran |
| 2008/0098260 A1 | 4/2008 | Okawa et al. |
| 2008/0104375 A1 | 5/2008 | Hansen et al. |
| 2008/0133885 A1 | 6/2008 | Glew |
| 2008/0162895 A1 | 7/2008 | Luick |
| 2008/0270749 A1 | 10/2008 | Ozer et al. |
| 2008/0307182 A1 | 12/2008 | Arimilli et al. |
| 2008/0313424 A1 | 12/2008 | Gschwind |
| 2009/0037698 A1 | 2/2009 | Nguyen |
| 2009/0113182 A1 | 4/2009 | Abernathy et al. |
| 2009/0198921 A1 | 8/2009 | Chen et al. |
| 2009/0265532 A1 | 10/2009 | Caprioli et al. |
| 2009/0300319 A1 | 12/2009 | Cohen et al. |
| 2010/0100685 A1 | 4/2010 | Kurosawa et al. |
| 2010/0161945 A1 | 6/2010 | Burky et al. |
| 2010/0191940 A1 | 7/2010 | Mejdrich et al. |
| 2012/0066482 A1 | 3/2012 | Gonion |
| 2012/0110271 A1 | 5/2012 | Boersma et al. |
| 2012/0246450 A1 | 9/2012 | Abdallah |
| 2013/0305022 A1* | 11/2013 | Eisen .............. G06F 9/30087 712/214 |
| 2014/0025933 A1 | 1/2014 | Venkataramanan et al. |
| 2014/0075159 A1 | 3/2014 | Frigo et al. |
| 2014/0215189 A1 | 7/2014 | Airaud et al. |
| 2014/0223144 A1 | 8/2014 | Heil et al. |
| 2014/0244239 A1 | 8/2014 | Nicholson et al. |
| 2014/0281408 A1 | 9/2014 | Zeng |
| 2015/0046662 A1* | 2/2015 | Heinrich .............. G06F 13/1621 711/151 |
| 2015/0121010 A1 | 4/2015 | Kaplan et al. |
| 2015/0121046 A1* | 4/2015 | Kunjan ............... G06F 9/30043 712/225 |
| 2015/0134935 A1 | 5/2015 | Blasco |
| 2015/0199272 A1 | 7/2015 | Goel et al. |
| 2015/0324204 A1 | 11/2015 | Eisen et al. |
| 2015/0324205 A1 | 11/2015 | Eisen et al. |
| 2015/0324206 A1 | 11/2015 | Eisen et al. |
| 2015/0324207 A1 | 11/2015 | Eisen et al. |
| 2016/0070571 A1 | 3/2016 | Boersma et al. |
| 2016/0070574 A1 | 3/2016 | Boersma et al. |
| 2016/0092231 A1 | 3/2016 | Chu et al. |
| 2016/0092276 A1 | 3/2016 | Chu et al. |
| 2016/0103715 A1 | 4/2016 | Sethia et al. |
| 2016/0202986 A1 | 7/2016 | Ayub et al. |
| 2016/0202988 A1 | 7/2016 | Ayub et al. |
| 2016/0202989 A1 | 7/2016 | Eisen et al. |
| 2016/0202990 A1 | 7/2016 | Brownscheidle et al. |
| 2016/0202991 A1 | 7/2016 | Eisen et al. |
| 2016/0202992 A1 | 7/2016 | Brownscheidle et al. |
| 2017/0168837 A1 | 6/2017 | Eisen et al. |
| 2017/0255465 A1 | 9/2017 | Chadha et al. |
| 2017/0277543 A1 | 9/2017 | McGlone et al. |
| 2017/0300328 A1 | 10/2017 | Cordes et al. |
| 2017/0329641 A1 | 11/2017 | Chadha et al. |
| 2017/0329713 A1 | 11/2017 | Chadha et al. |
| 2017/0351521 A1 | 12/2017 | Hrusecky |
| 2017/0357507 A1 | 12/2017 | Cordes et al. |
| 2017/0357508 A1 | 12/2017 | Cordes et al. |
| 2017/0371658 A1 | 12/2017 | Eickemeyer et al. |

FOREIGN PATENT DOCUMENTS

| | | |
|---|---|---|
| CN | 101876892 A | 11/2010 |
| CN | 102004719 A | 4/2011 |
| EP | 1212680 B1 | 7/2007 |
| GB | 2356324 A | 5/2001 |
| GB | 2356324 B | 10/2001 |
| JP | 2009157887 A | 7/2009 |
| WO | WO 2015/067118 A1 | 5/2015 |

OTHER PUBLICATIONS

U.S. Appl. No. 15/180,838, to Robert A. Cordes et al., entitled, *Operation of a Multi-Slice Processor Implementing Simultaneous Two-Target Loads and Stores*, assigned to International Business Machines Corporation, 37 pages, filed Jun. 13, 2016.

U.S. Appl. No. 15/193,338, to Richard J. Eickemeyer et al., entitled, *Managing a Divided Load Reorder Queue*, assigned to International Business Machines Corporation, 35 pages, filed Jun. 27, 2016.

U.S. Appl. No. 15/230,532, to Sundeep Chadha et al., entitled, *Flush Avoidance in a Load Store Unit*, assigned to International Business Machines Corporation, 37 pages, filed Aug. 8, 2016.

U.S. Appl. No. 15/219,638, to Robert A. Cordes et al., entitled, *Operation of a Multi-Slice Processor Implementing Simultaneous Two-Target Loads and Stores*, assigned to International Business Machines Corporation, 37 pages, filed Jul. 26, 2016.

U.S. Appl. No. 15/221,035, to Sundeep Chadha et al, entitled, *Operation of a Multi-Slice Processor implementing a Load/Store Unit Maintaining Rejected Instructions*, assigned to International Business Machines Corporation, 37 pages, filed Jul. 27, 2016.

Gebhart et al., *A Hierarchical Thread Scheduler and Register File for Energy-efficient Throughput Processors*, ACM Transactions on Computer Systems, Apr. 2012, pp. 8:1-8:38, vol. 30, No. 2, Article 8, ACM New York.

Anonymous, *Method and system for Implementing "Register Threads" in a Simultaneously-Multithreaded (SMT) Processor Core*, An IP.com Prior Art Database Technical Disclosure, IP.com No. IPCOM000199825D IP.com Electronic Publication: Sep. 17, 2010 pp. 1-4 <http://ip.com/IPCOM/000199825>.

Czajkowski et al., *Resource Management for Extensible Internet Servers*, Proceedings of the 8 ACM SIGOPS European Workshop on Support for Composing Distributed Applications Sep. 1998 pp. 33-39 ACM Portugal.

Bridges et al., *A CPU Utilization Limit for Massively Parallel MIMD Computers*, Fourth Symposium on the Frontiers of Massively Parallel Computing Oct. 19-21, 1992 pp. 83-92 IEEE VA US.

Pechanek et al., *ManArray Processor Interconnection Network: An Introduction*, Euro-Par' 99 Parallel Processing, Lecture Notes in Computer Science, 5th International Euro-Par Conference, Aug. 31-Sep. 3, 1999, Proceedings, pp. 761-65, vol. 1685, Spring Berlin Heidelberg, Toulouse, France.

Pechanek et al., *The ManArray Embedded Processor Architecture*, Proceedings of the 26 Euromicro Conference, IEEE Computer Society, Sep. 5-7, 2000, pp. 348-355, vol. 1, Maastricht.

Anonymous, *Precise Merging Translation Queue in a Slice-Based Processor*, An IP.com Prior Art Database Technical Disclosure, IP.com No. IPCOM000249317D IP.com Electronic Publication: Feb. 16, 2017, pp. 1-3. <https://priorart.ip.com/IPCOM/000249317>.

International Search Report and Written Opinion, PCT/IB2015/052741, dated Oct. 9, 2015.

Anonymous, "A Novel Data Prefetch Method Under Heterogeneous Architecture", IP.com Prior Art Database Technical Disclosure No. 000224167 (online), Dec. 2012, 14 pages, URL: http://ip.com/IPCOM/000224167.

Anonymous, "Method and System for Predicting Performance Trade-Offs During Critical Path Execution in a Processor", IP.com Prior Art Database Technical Disclosure No. 000223340 (online), Nov. 2012, 7 pages, URL: http://ip.com/IPCOM/000223340.

(56) References Cited

OTHER PUBLICATIONS

IBM, "Using a mask to block the wakeup of dependents of already-issued instructions", An IP.com Prior Art Database Technical Disclosure (online), IP.com No. 000193322, URL: http://ip.com/IPCOM/000193322, dated Feb. 18, 2010, 2 pages.

Anonymous, "Fast wakeup of load dependent instructions by a select bypass", An IP.com Prior Art Database Technical Disclosure (online), IP.com No. 000216900, URL: http://ip.com/IPCOM/000216900, dated Apr. 23, 2012, 2 pages.

Kalla, et al., "IBM Power5 Chip: A Dual-Core Multithreaded Processor", IEEE Micro, vol. 24, No. 2, Mar. 2004, pp. 40-47, IEEE Xplore Digital Library (online), DOI: 10.1109/MM.2004.1289290.

Mathis et al., "Characterization of simultaneous multithreading (SMT) efficiency in POWER5", IBM Journal of Research and Development, Jul. 2005, pp. 555-564, vol. 49, No. 4/5, International Business Machines Corporation, Armonk, NY.

Sha et al., "Scalable Store-Load Forwarding via Store Queue Index Prediction", Proceedings of the 38th Annual IEEE/ACM International Symposium on Microarchitecture (MICRO'05), dated Nov. 2005, 12 pages, http://repository.upenn.edu/cis_papers/262 (online), ISBN: 0-7695-2440-0; DOI: 10.1109/MICRO.2005.29, IEEE Computer Society, Washington, DC.

ROC920150400US1, Appendix P; List of IBM Patent or Applications Treated as Related, Sep. 22, 2016, 2 pages.

Roth, *Store Vulnerability Window (SVW): Re-Execution Filtering for Enhanced Load/Store Optimization,* Technical Reports (CIS), Paper 35, Jan. 2004, 23 pages, University of Pennsylvania Scholarly Commons (online), <https://repository.upenn.edu/cgi/viewcontent.cgi?referer=https://www.google.com/&httpsredir=1&article=1023&context=cis_reports>.

Bobba et al., *Safe and Efficient Supervised Memory Systems,* 17th International Symposium on High Performance Computer Architecture (HPCA), Feb. 2011, 12 pages, IEEE xPlore Digital Library (online; IEEE.org), DOI: 10.1109/HPCA.2011.5749744.

\* cited by examiner

OPERATION OF A MULTI-SLICE PROCESSOR WITH AN EXPANDED MERGE FETCHING QUEUE

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Such a multi-slice processor may further include a load/store slice comprising a load miss queue and a load reorder queue. Operation of such a multi-slice processor includes: receiving, at a load reorder queue, a load instruction requesting data; responsive to the data not being stored in a data cache, determining whether a previous load instruction is pending a fetch of a cache line comprising the data; if the cache line does not comprise the data, allocating an entry for the load instruction in the load miss queue; and if the cache line does comprise the data: merging, in the load reorder queue, the load instruction with an entry for the previous load instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
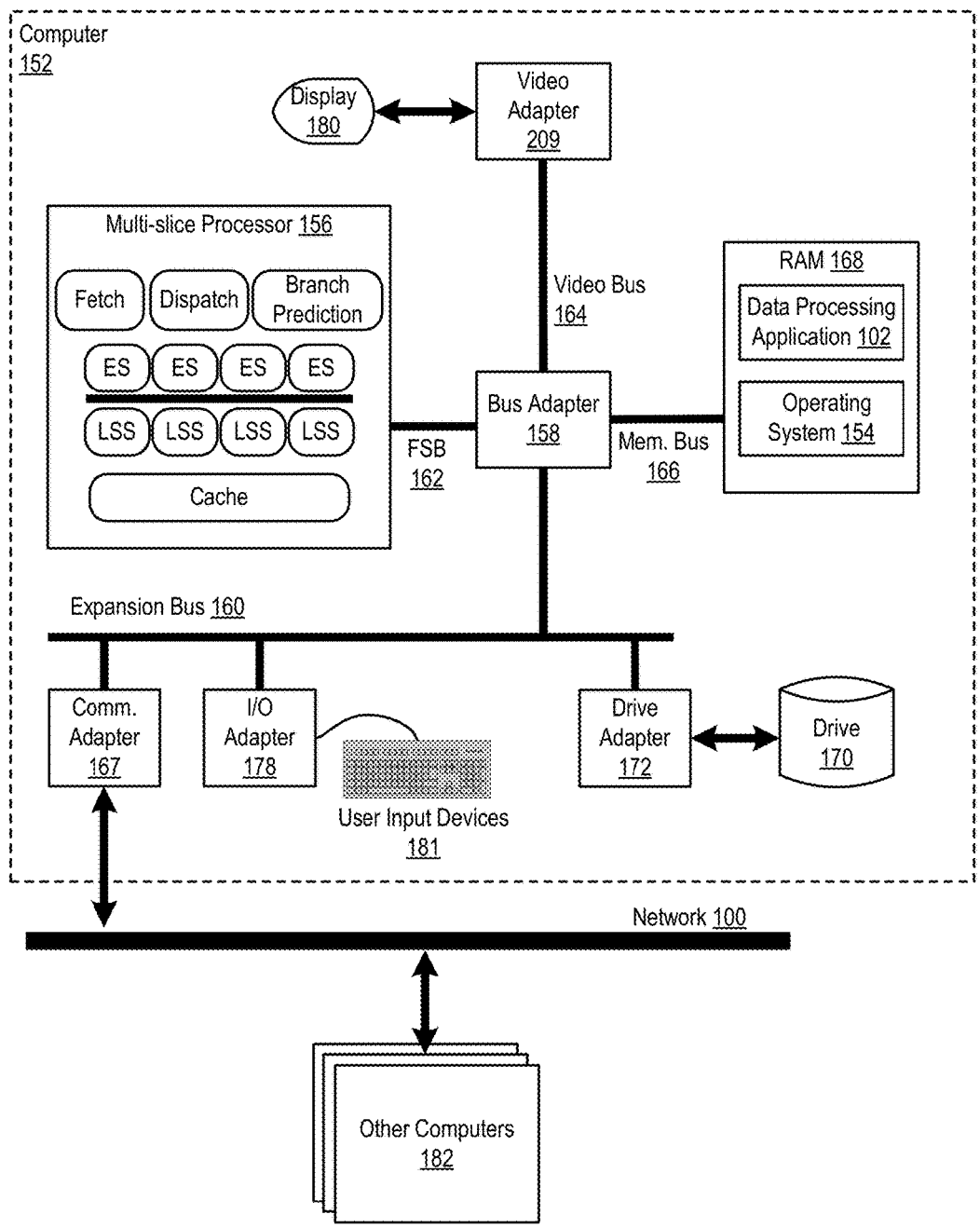
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
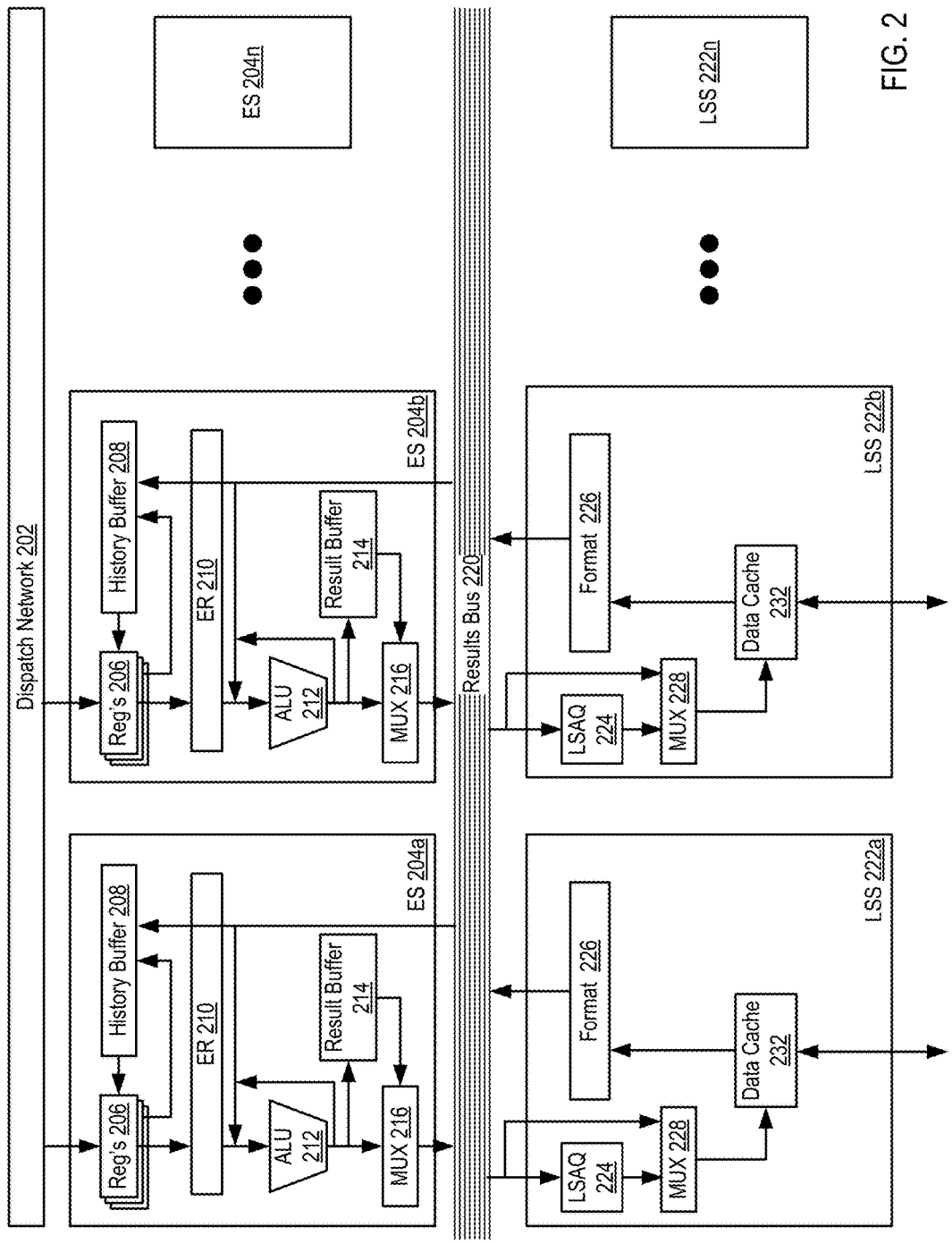
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226). The queue receives load and store operations to be carried out by the load/store slice (222). The formatting logic (226) formats data into a form that may be returned on the results bus (220) to an execution slice as a result of a load instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

Figure 3:
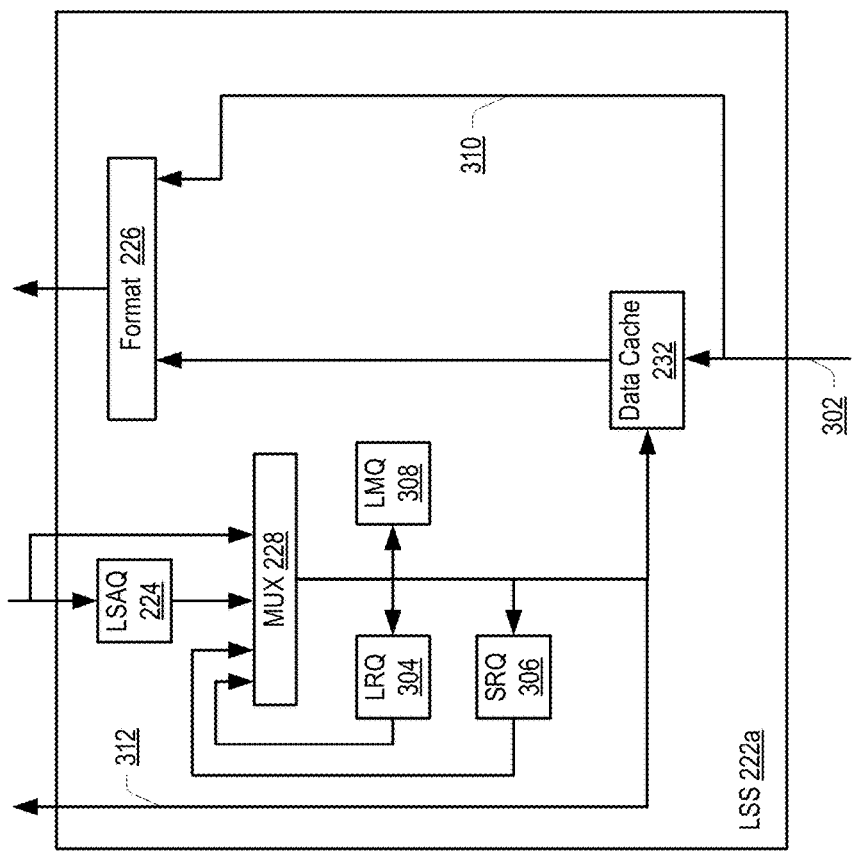
FIG. 3 sets forth a block diagram of a portion of a load/store slice of a multi-slice processor, where the load/store slice implements an expanded merge fetching queue according to different embodiments.

For further explanation, FIG. 3 sets forth a block diagram depicting an expanded view of a load/store slice (222a) implementing architectural components that include an expanded merge fetching queue. The load/store slice (222a) includes a load miss queue (LMQ) (308), a load reorder queue (LRQ) (304), and a store reorder queue (SRQ) (306).

The example load/store slice (222a) of FIG. 2 may retrieve data from any tier of a memory hierarchy, beginning with a local data cache (232), and extending as far down in the hierarchy as needed to find requested data. The requested data, when received, may be provided to general purpose registers, virtual registers, or to some other destination. The received data may also be stored in a data cache (232) for subsequent access. The load/store slice (222a) may also manage translations of effective addresses to real addresses to communicate with different levels of memory hierarchy.

A store reorder queue (306) may include entries for tracking the cache operations for sequential consistency and may reissue operations into the load/store pipeline for execution independent of an execution slice.

A load miss queue (308) may issue requests for data to one or more data storage devices of a multi-tiered memory hierarchy, where a request for data may correspond to a load instruction for the data.

Responsive to the data being returned along the line (302) to the load/store slice (222a), the data may be delivered to a destination such as the results bus (220 of FIG. 2) to be loaded into, for example, a general purpose register—where the delivery of the data may be from the data cache (232) or over the line (310). The line (310) bypasses the data cache (232) and allows implementation of a critical data forwarding path. The load miss queue (308) may also use line (312) to notify an instruction sequencing unit (not shown), or some other logical component, that the data is available.

Responsive to a load instruction requesting data that is not stored in the data cache (232), a fetch of data to a lower tier of memory may result in a cache line being returned, where the cache line is typically larger than the data being requested in a load instruction.

If the load miss queue (308) receives multiple load instructions that may be satisfied with a single cache line, then "merging" the load operations allows the load miss queue (308) to avoid multiple cache line fetches to satisfy the multiple load instructions. A merge of load operations may be carried out by determining that a previous load instruction has caused a fetch of a cache line that would satisfy a load instruction requesting data within the same cache line, and maintaining tracking information that indicates that each of the multiple load operations may be satisfied using the same cache line.

A load reorder queue (304) may track execution of cache operations issued to the load/store slice (222a) and includes entries for tracking cache operations for sequential consistency, among other attributes. The load reorder queue (304) may also reissue operations into the load/store pipeline for execution, which provides operation that is independent of the execution slices.

Given that the load reorder queue (304) maintains, for other purposes, much of the information usable to track merged load operations, the overhead in logic and circuit space is reduced by augmenting the functionality of the load reorder queue (304) to track merges instead of augmenting the load miss queue (308) to maintain and track merges. In other words, the additional logic for tracking merges added to the load reorder queue (304) adds a small amount of overhead for each additional merge as opposed to a larger amount of overhead for tracking merges that would be incurred by the load miss queue (308)—or by any other logical component that does not already track load operations.

In this way, every entry of the load/store slice (222a) may implement merging of any number of load operations without being limited by the overhead of tracking the merge operations.

Figure 4:
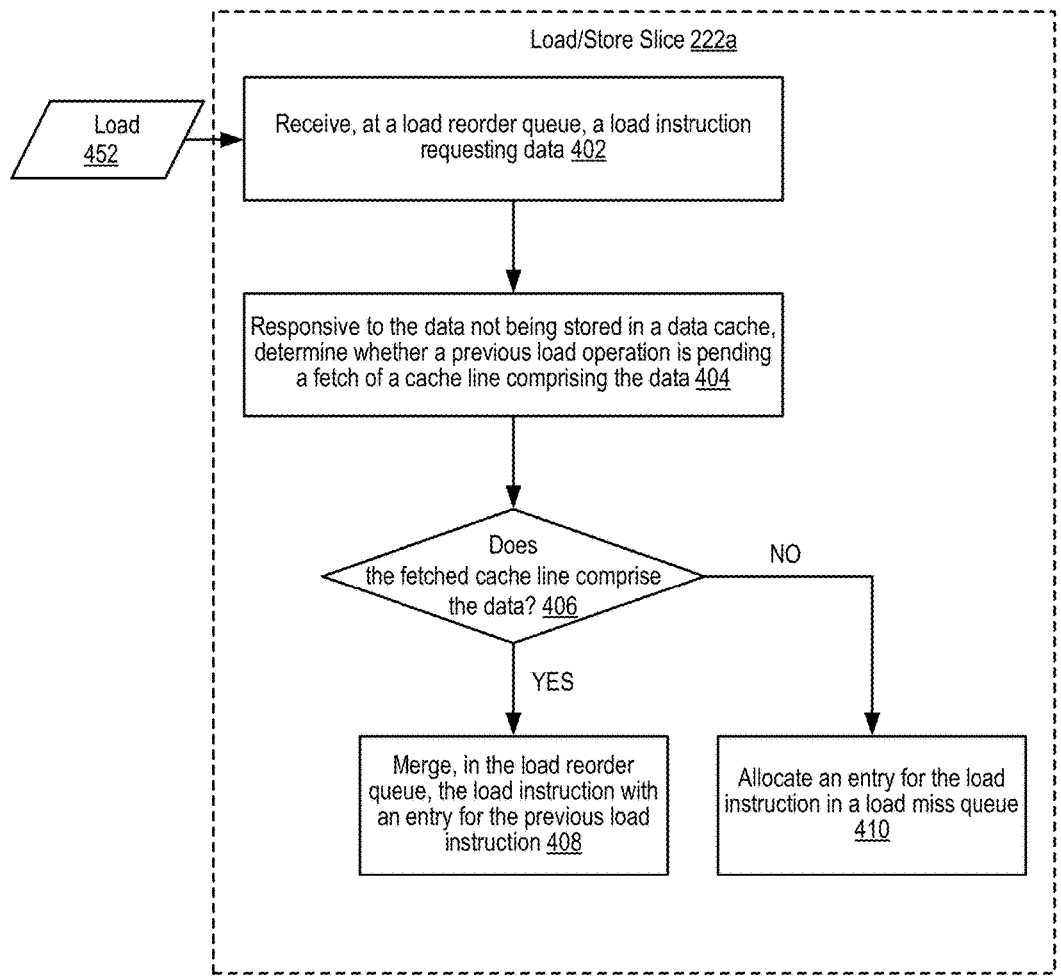
FIG. 4 sets forth a flow chart illustrating an exemplary method of operation of a multi-slice processor in which a load/store slice is configured to implement an expanded merge fetching queue.

For further explanation, FIG. 4 sets forth a flow chart illustrating an exemplary method of operation of a multi-slice processor in which a load/store slice is configured to implement an expanded merge fetching queue. The method of FIG. 4 may be carried out by a multi-slice processor similar to that in the examples of FIGS. 2 and 3. Such a multi-slice processor may include a plurality of load/store slices, where each of the load/store slices may include a load miss queue (308) and a load reorder queue (304), and where each load reorder queue (304) may include a plurality of entries, as described above with regard to FIG. 3.

The method of FIG. 4 includes receiving (402), at a load reorder queue (304), a load instruction (452) requesting data. Receiving (402) the load instruction may be carried out by the load/store slice (222a) receiving, at a load/store access queue (224), a request for the data from an execution slice, and the load/store slice (222a) moving the load operation through the load/store slice (222a) pipeline, which includes providing the load operation to the load reorder queue (304)—where the load reorder queue (304) may proceed to create an entry for the load operation or to merge the load operation with an existing entry in response to indications received from the load miss queue (308). For example, the load miss queue (308) may determine whether an outstanding fetch of a cache line, for some other, previous, load instruction, would include the data being requested by the current load instruction, and the load miss queue (308) may provide the load reorder queue (304) with indications regarding whether a new entry is to be created, whether an existing entry has requested a cache line that includes the data requested by the current load instruction, among other indications.

Further, data cache (232) may inform both the load reorder queue (304) and the load miss queue (308) that a load instruction address generated a data cache miss—on a data cache hit, there is no merging. The load miss queue (308), in response to a data cache miss, provides the load reorder queue (304) with an indication including: an indication that the address for the load instruction is already in the load miss queue (308), which the load reorder queue (304) may interpret as a corresponding cache line already being fetched; an indication that the address for the load instruction is new, and not already in the load miss queue (308), which the load reorder queue (304) may interpret as no merging; an indication that the load miss queue (308) is unable to handle the load instruction at the present time, among other indications. The load reorder queue (304), given an indication from the load miss queue (308), may then determine, based at least in part on the indication, whether to merge the load instruction with an existing entry in the load reorder queue (304), or whether to create a new entry for the load instruction in the load reorder queue (304), and not merge the load instruction. Generally, the data being requested by the current load instruction and the previous load instruction are not necessarily the same data, rather, each of the instructions may be requesting different portions of the cache line being requested.

With regard to the load miss queue (308), a previous load operation may have caused the load miss queue (308) to determine that requested data was not stored in local data cache (232), thereby causing a fetch of the data from lower levels of memory. In this case, an entry for the previous load operation is queued in the load miss queue (308), and the load operation remains in the load miss queue (308) until the fetch of the requested data completes and the load is satisfied. Alternatively, the load miss queue (308) may determine that the requested data is stored in the data cache (232), thereby avoiding a fetch of the data from lower levels of memory to satisfy the load operation.

The method of FIG. 4 also includes, responsive to the data not being stored in the data cache (232), determining (404) whether a previous load operation is pending a fetch of a cache line comprising the data. Determining (404) whether a previous load operation is pending a fetch of a cache line comprising the data may be carried out by the load reorder queue (304) receiving an indication from the load miss queue (308) indicating whether an existing, enqueued, entry in the load miss queue (308) has requested a cache line that includes the data being requested by the load operation, or whether the load miss queue (308) is creating a new entry for the load instruction.

The method of FIG. 4 also includes, if the cache line does not comprise the data, allocating (410) an entry for the load instruction in the load miss queue (308). In other words, if a fetch for a cache line that includes the data has already been made due to a previous load operation, there is no need to request the cache line again. Instead, as discussed below, the load reorder queue (304)—given an indication that a previous load instruction has caused a pending fetch of a cache line that would satisfy the current load instruction—may merge the current load instruction with the previous load instruction to avoid a redundant data fetch and occupying an entire entry. A merge may be managed by the load reorder queue (304) and the fetch may be managed by the load miss queue (308). Further, on a data cache miss, entries may be created in both the load miss queue (308) and the load reorder queue (304), where the newly created entry in the load reorder queue (304) may serve as a basis for a merge for a future load instruction.

In other words, on a data cache miss, an entry is created for the load operation in the load miss queue (308) if the cache line being fetched does not comprise the data requested by the current load instruction—where a negative decision regarding the cache line comprising the data is reflected at (406), which leads to allocating (410) the entry for the load operation in the load miss queue (308). Allocating (410) the entry for the load operation in the load miss queue (308) may be carried out by the load miss queue (308)

independently of the load reorder queue (304), where the load miss queue (308) determines that the address for the load instruction is not satisfied by any previously requested cache line for loads already in the load miss queue (308), and where the load miss queue (308) proceeds to create an entry for the load instruction in the load miss queue (308). In this case, on a data cache miss and where no pending fetches comprise data requested by the current load instruction—the load reorder queue (304) also creates an entry based on the load miss queue (308) indicating to the load reorder queue (304) that the load miss queue (308) is creating an entry for the load instruction, where this new entry in the load reorder queue (304) may be the subject of a merge for a later load instruction.

Generally, the load reorder queue (304) may track information regarding: destination registers for writing the requested data; formatting information such as address alignment and instruction op codes to deliver critical data forward data in proper alignment to a general purpose register (e.g. floating point, fixed point, integer, algebraic, among others); completion information including whether the critical data forward is valid or whether the critical data forward has been flushed by an older instruction; and collision checking to assure that the data returning from the memory is a latest copy of the memory with respect to store data this is draining or yet to be drained from the local store queues, where a collision may leave a returning cache line and the critical data forward data stale, and therefore, incorrect.

The method of FIG. 4 also includes, if the cache line does comprise the data, merging (408), in the load reorder queue (304), the load instruction with an entry for the previous load instruction. In other words, if, there is a cache line being requested for a previous load operation, where the requested cache line does comprise the data, the method of FIG. 4 continues by: merging (408) the load instruction with an entry for the previous load instruction in the load reorder queue (304) that corresponds to the requested cache line pending a fetch—where a positive decision regarding a requested cache line comprising the data requested by the current load instruction is reflected at (406), leading to merging (408), in the load reorder queue (304), the load instruction with an entry for the previous load instruction.

Merging (408) the load instruction in the load reorder queue (304) with a previous load instruction may be carried out by the load reorder queue (304) receiving information from the load miss queue (308) indicating which load miss queue (308) entry for a previous load instruction caused a collision with the load instruction, where the collision is due to an outstanding fetch for the previous load instruction that would retrieve a cache line that includes data requested by the load instruction. The load reorder queue (304) may use the entry information for the previous load instruction to identify the corresponding previous load instruction in the load reorder queue (304) with which to merge the current load instruction, for example, by setting information in the entry being merged to identify the current load instruction.

In other examples, merging (408) the load instruction in the load reorder queue (304) with a previous load instruction may be carried out by the load reorder queue (304) receiving information from the load miss queue (308) indicating which load miss queue (308) entry for a previous load instruction caused a collision with the load instruction, where the collision is due to an outstanding fetch for the previous load instruction that would retrieve a cache line that includes data requested by the load instruction. However, in contrast to the above example, instead of using an entry for the previous load instruction in the load reorder queue (304) to track a merge with the load instruction, the load reorder queue (304) creates an entry for the current load instruction and stores within the entry for the current load instruction a pointer to an entry in the load miss queue (308) corresponding to the load instruction that caused the pending fetch of the cache line. In this example, the entry for the previous load instruction in the load reorder queue (304) also stores a pointer to the same entry in the load miss queue (308) corresponding to the load instruction that caused the pending fetch of the cache line—which may be the same instruction in the load reorder queue (304). Further, the respective entries in both the load reorder queue (304) and the load miss queue (308) may be identifiable according to ITAGs. In this example, each entry in the load reorder queue (304) that includes a pointer to a same entry in the load miss queue (308) may be considered to be merged.

The load miss queue (308), after communicating information to the load reorder queue (304) for merging the load operation with the previous load operation, may reject the load instruction and not queue the load instruction in the load miss queue because the load reorder queue (304) is now responsible for tracking the merge of the load instruction with the previous load instruction.

In other words, merging (408), in the load reorder queue (304), the load instruction with an entry for the previous load instruction may be carried out by the load reorder queue (304) using the information received from the load miss queue (308) corresponding to the load instruction to identify the previous load instruction within the load reorder queue (304) and setting tracking information within the entry for the previous load instruction indicating a merge with an entry created for the load instruction rejected by the load miss queue, and setting tracking information within the entry for the load instruction indicating a merge with an entry created for the previous load instruction.

Further, the load reorder queue (304) may track the progress of the requested cache line and may track relative ages of the load instructions that have been merged so that in response to the cache line being detected, the load reorder queue may schedule the oldest of the merged load instructions for receiving critical data forwarding data, and younger load instructions to receive data from the data cache (232).

For example, the load reorder queue (304) may schedule the previous load instruction to receive data from line (310) at a first cycle, which bypasses data cache (232), and on a subsequent cycle, schedule the load instruction to receive data retrieved from the data cache (232)—since by the time that the critical data forwarding data is received, the cache line is stored in the data cache (232).

In this way, the load reorder queue (304) may implement an expanded merge fetching queue that is not limited by overhead in the load miss queue (308), but rather the merge fetching may encompass any number of the existing entries of the load reorder queue (304). In other words, if a merge is to be performed, the merge is managed by the load reorder queue (304) and not the load miss queue (308), thereby avoiding the use of load miss queue (308) resources.

Figure 5:
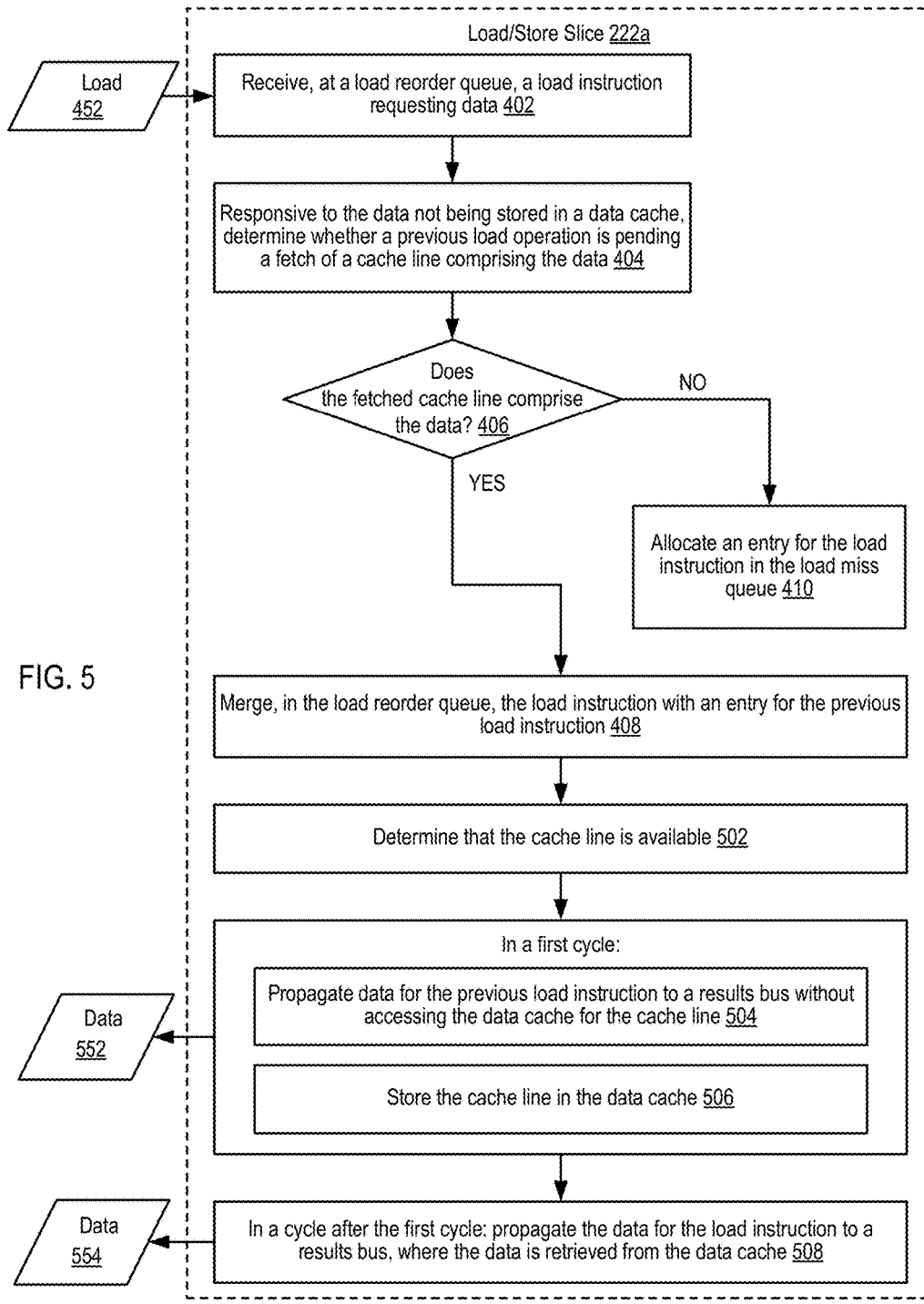
FIG. 5 sets forth a flow chart illustrating an exemplary method of operation of a multi-slice processor in which a load/store slice is configured to implement an expanded merge fetching queue.

For further explanation, FIG. 5 sets forth a flow chart illustrating an exemplary method of operation of a multi-slice processor in which a load/store slice is configured to implement an expanded merge fetching queue. The method of FIG. 5 may be carried out by a multi-slice processor similar to that in the examples of FIGS. 2 and 3. Such a multi-slice processor may include a plurality of load/store slices, where each of the load/store slices may include a load miss queue (308) and a load reorder queue (304), and where each load reorder queue (304) may include a plurality of entries, as described above with regard to FIG. 3.

The method of FIG. 5 is similar to the method of FIG. 4 in that the method of FIG. 5 also includes receiving (402), at a load reorder queue (304), a load instruction (452) requesting data; responsive to the data not being stored in the data cache (232), determining (404) whether a previous load operation is pending a fetch of a cache line comprising the data; if the cache line does not comprise the data, allocating (410) an entry for the load operation in the load miss queue (308); if the cache line does comprise the data: merging (408), in the load reorder queue (304), the load instruction with an entry for the previous load instruction.

The method of FIG. 5 differs from the method of FIG. 4, however, in that the method of FIG. 5 includes determining (502) that the cache line is available. Determining (502) that the cache line is available may be carried out by the load miss queue (308) tracking movement of the cache line being fetched as the cache line progresses from lower levels of the memory hierarchy to the data cache (232), where the cache line reaches the data cache (232) along line (302), as depicted in FIG. 3.

The method of FIG. 5 also includes, in a first cycle: propagating (504) data for the previous load instruction to a results bus without accessing the data cache (232) for the cache line; and storing (506) the cache line in the data cache (232). As described in this example, the first cycle is deemed a "first" cycle for relative ordering with regard to later cycles.

Propagating (504) data (552) for the previous load to the results bus without accessing the data cache (232) may be carried out by the load reorder queue (304) using the determination that the cache line is coming up into the data cache (232) to route the data requested by the previous load instruction from the cache line to the results bus—and also notifying another logical component, such as the instruction sequencing unit, that the data is available to be written to a destination such as a general purpose register.

In bypassing the data cache (232), one or more cycles may be saved in fulfilling the load instruction since there is no delay for the cycle or cycles used to write the data cache and read from the data cache to fulfill the load instruction. The data bypassing the data cache may be considered critical data forwarding data.

Storing (506) the cache line in the data cache may be carried out by the data cache (232) receiving and storing the cache line as it comes up from a lower level of memory in the memory hierarchy. In this way, as the critical data forwarding data is being provided, the data cache may hold the data for a next load instruction to be satisfied at a later processing cycle.

The method of FIG. 5 also includes, in a cycle after the first cycle, propagating (508) the data for the load instruction to a results bus, where the data is retrieved from the data cache (232).

Propagating (508) the data for the load instruction to the results bus in a cycle after the critical data forwarding data was propagated may be carried out by the load reorder queue (304) scheduling the data for the load instruction to be transmitted to the results bus after the previous load instruction, where propagating the data (554) for the load instruction to the results bus may be carried out by retrieving the data from the data cache (232) and transmitting the data (554) to the results bus.

In this way, the multiple load instructions that have been merged may be scheduled to be fulfilled in as few cycles as practicable, where older load instructions are fulfilled along the critical data forwarding path, and later load instruction are fulfilled from the data cache.

Figure 6:
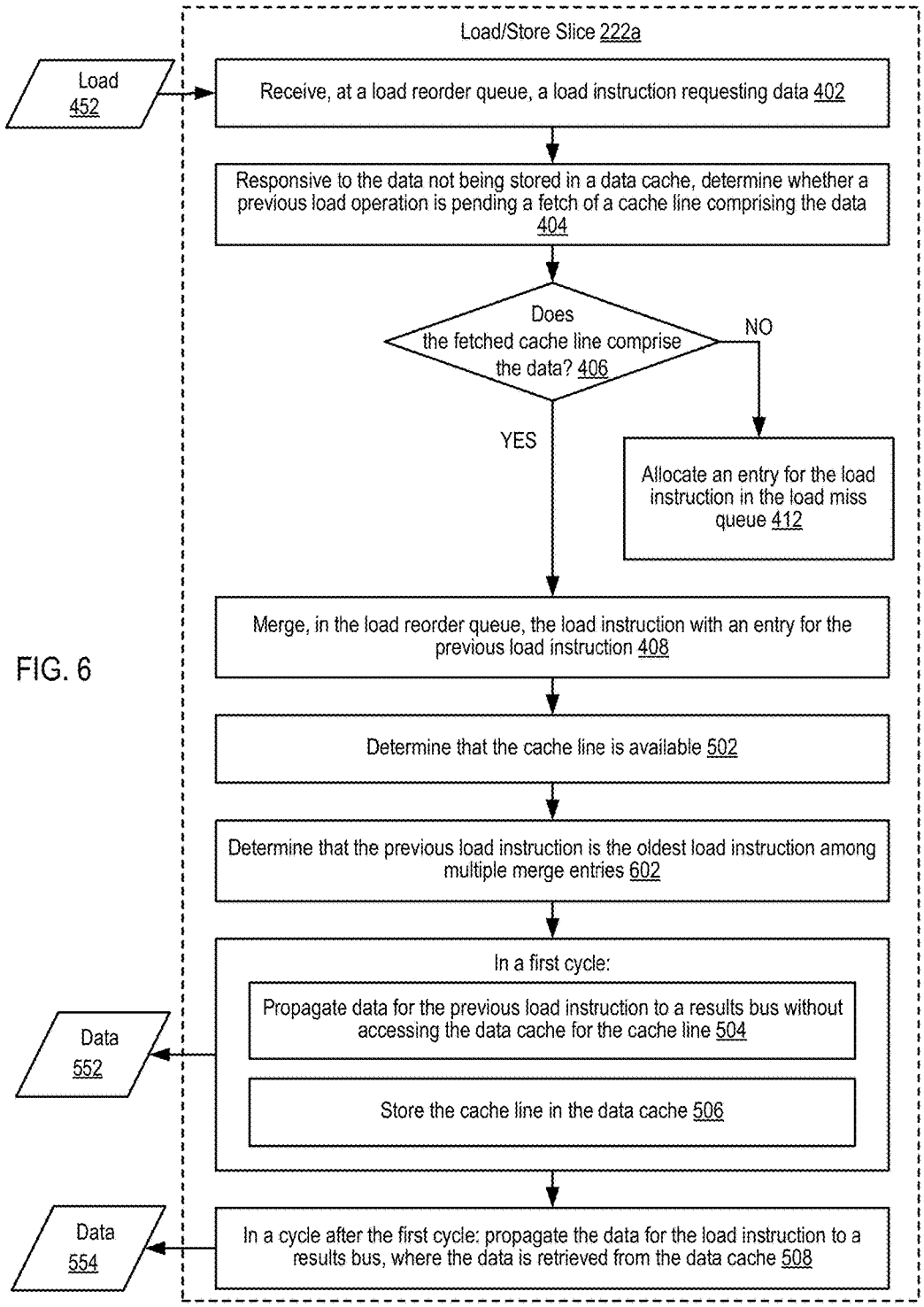
FIG. 6 sets forth a flow chart illustrating an exemplary method of operation of a multi-slice processor in which a load/store slice is configured to implement an expanded merge fetching queue.

For further explanation, FIG. 6 sets forth a flow chart illustrating an exemplary method of operation of a multi-slice processor in which a load/store slice is configured to implement an expanded merge fetching queue. The method of FIG. 6 may be carried out by a multi-slice processor similar to that in the examples of FIGS. 2 and 3. Such a multi-slice processor may include a plurality of load/store slices, where each of the load/store slices may include a load miss queue (308) and a load reorder queue (304), and where each load reorder queue (304) may include a plurality of entries, as described above with regard to FIG. 3.

The method of FIG. 6 is similar to the method of FIG. 5 in that the method of FIG. 5 also includes receiving (402), at a load reorder queue (304), a load instruction (452) requesting data; responsive to the data not being stored in the data cache (232), determining (404) whether a previous load operation is pending a fetch of a cache line comprising the data; if the cache line does not comprise the data, allocating (410) an entry for the load operation in the load miss queue (308); if the cache line does comprise the data: merging (408), in the load reorder queue (304), the load instruction with an entry for the previous load instruction; determining (502) that the cache line is available; propagating (504) data for the previous load instruction to a results bus without accessing the data cache (232) for the cache line; storing (506) the cache line in the data cache (232); and propagating (508) the data for the load instruction to a results bus, where the data is retrieved from the data cache (232).

The method of FIG. 6 differs from the method of FIG. 5, however, in that the method of FIG. 6 includes determining (602) that the previous load instruction is the oldest load instruction among multiple merge entries.

Determining (602) that the previous load instruction is the oldest load instruction among multiple merge entries may be carried out by the load reorder queue (304) accessing entry information for each load operation corresponding to a single merge for a given cache line, where the entry information includes information for ordering the multiple merge entries.

In this way, the load reorder queue (304) may select the oldest of the load instructions corresponding to a merge to benefit from the critical data forwarding path, and where later load instruction may retrieve data from the data cache (232) in later cycles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices and a plurality of load/store slices, each load/store slice comprising a load miss queue and a load reorder queue, the method comprising:
   receiving, at the load reorder queue, a load instruction requesting data;
   responsive to the data not being stored in a data cache, determining whether a previous load instruction is pending a fetch of a cache line comprising the data;
   if the cache line does not comprise the data, allocating an entry for the load instruction in the load miss queue;
   if the cache line does comprise the data: merging, in the load reorder queue, the load instruction with an entry for the previous load instruction;
   determining that the cache line is available; and
   in a first cycle: propagating data for the previous load instruction to a results bus without accessing the data cache for the cache line; and storing the cache line in the data cache; and in a cycle after the first cycle: propagating the data for the load instruction to a results bus, wherein the data is retrieved from the data cache.

2. The method of claim 1, wherein the load reorder queue comprises a plurality of entries, and wherein each of the plurality of entries of the load reorder queue comprises a field for data indicating a merge with another entry in the plurality of entries of the load reorder queue.

3. The method of claim 2, wherein multiple entries of the plurality of entries are merged, and wherein the method further comprises:
determining that the previous load instruction is the oldest load instruction among multiple merge entries.

4. The method of claim 3, wherein propagating the data for the previous load instruction to the results bus without accessing the data cache for the cache line is in dependence upon determining that the previous load instruction is the oldest load instruction among the multiple entries.

5. The method of claim 1, wherein if the cache line does not comprise the data, an entry for the load instruction is not allocated within the load miss queue.

6. The method of claim 1, wherein merging the entry comprises modifying an entry in the load reorder queue for the previous load instruction indicating a merge with the load instruction.

7. A multi-slice processor comprising:
a plurality of execution slices and a plurality of load/store slices, each load/store slice comprising a load miss queue and a load reorder queue, wherein the multi-slice processor is configured to carry out:
receiving, at the load reorder queue, a load instruction requesting data;
responsive to the data not being stored in a data cache, determining whether a previous load instruction is pending a fetch of a cache line comprising the data;
if the cache line does not comprise the data, allocating an entry for the load instruction in the load miss queue;
if the cache line does comprise the data: merging, in the load reorder queue, the load instruction with an entry for the previous load instruction;
determining that the cache line is available; and
in a first cycle: propagating data for the previous load instruction to a results bus without accessing the data cache for the cache line; and storing the cache line in the data cache; and
in a cycle after the first cycle: propagating the data for the load instruction to a results bus, wherein the data is retrieved from the data cache.

8. The multi-slice processor of claim 7, wherein the load reorder queue comprises a plurality of entries, and wherein each of the plurality of entries of the load reorder queue comprises a field for data indicating a merge with another entry in the plurality of entries of the load reorder queue.

9. The multi-slice processor of claim 8, wherein multiple entries of the plurality of entries are merged, and wherein the multi-slice processor is further configured to carry out:
determining that the previous load instruction is the oldest load instruction among multiple merge entries.

10. The multi-slice processor of claim 9, wherein propagating the data for the previous load instruction to the results bus without accessing the data cache for the cache line is in dependence upon determining that the previous load instruction is the oldest load instruction among the multiple entries.

11. The multi-slice processor of claim 7, wherein if the cache line does not comprise the data, an entry for the load instruction is not allocated within the load miss queue.

12. The multi-slice processor of claim 7 wherein merging the entry comprises modifying an entry in the load reorder queue for the previous load instruction indicating a merge with the load instruction.

13. An apparatus comprising:
a multi-slice processor, the multi-slice processor comprising:
a plurality of execution slices and a plurality of load/store slices, each load/store slice comprising a load miss queue and a load reorder queue, wherein the multi-slice processor is configured to carry out:
receiving, at the load reorder queue, a load instruction requesting data;
responsive to the data not being stored in a data cache, determining whether a previous load instruction is pending a fetch of a cache line comprising the data;
if the cache line does not comprise the data, allocating an entry for the load instruction in the load miss queue;
if the cache line does comprise the data: merging, in the load reorder queue, the load instruction with an entry for the previous load instructions;
determining that the cache line is available; and
in a first cycle: propagating data for the previous load instruction to a results bus without accessing the data cache for the cache line; and storing the cache line in the data cache; and
in a cycle after the first cycle: propagating the data for the load instruction to a results bus, wherein the data is retrieved from the data cache.

14. The apparatus of claim 13, wherein the load reorder queue comprises a plurality of entries, and wherein each of the plurality of entries of the load reorder queue comprises a field for data indicating a merge with another entry in the plurality of entries of the load reorder queue.

15. The apparatus of claim 14, wherein multiple entries of the plurality of entries are merged, and wherein the multi-slice processor is further configured to carry out:
determining that the previous load instruction is the oldest load instruction among multiple merge entries.

16. The apparatus of claim 15, wherein propagating the data for the previous load instruction to the results bus without accessing the data cache for the cache line is in dependence upon determining that the previous load instruction is the oldest load instruction among the multiple entries.

17. The apparatus of claim 13, wherein if the cache line does not comprise the data, an entry for the load instruction is not allocated within the load miss queue.

* * * * *